(12) United States Patent
Liang et al.

(10) Patent No.: US 9,102,824 B2
(45) Date of Patent: Aug. 11, 2015

(54) POLYMER COMPOSITIONS, METHODS OF MAKING THE SAME, AND ARTICLES PREPARED FROM THE SAME

(75) Inventors: Wenbin Liang, Pearland, TX (US); Brian W. Walther, Clute, TX (US); Timothy E. Clayfield, Waedenswil (CH); Arnis U. Paeglis, Friendswood, TX (US); Sherrika D. Daniel, Manvel, TX (US); Larry A. Meiske, Baton Rouge, LA (US)

(73) Assignee: Dow Global Technologies LLC, Midland, MI (US)

( * ) Notice: Subject to any disclaimer, the term of this patent is extended or adjusted under 35 U.S.C. 154(b) by 526 days.

(21) Appl. No.: 13/377,916

(22) PCT Filed: Jul. 14, 2010

(86) PCT No.: PCT/US2010/041943
§ 371 (c)(1),
(2), (4) Date: Dec. 13, 2011

(87) PCT Pub. No.: WO2011/008837
PCT Pub. Date: Jan. 20, 2011

(65) Prior Publication Data
US 2012/0116021 A1 May 10, 2012

Related U.S. Application Data

(60) Provisional application No. 61/225,631, filed on Jul. 15, 2009.

(51) Int. Cl.
*C08L 23/16* (2006.01)
*C08L 47/00* (2006.01)
*C08F 297/06* (2006.01)

(52) U.S. Cl.
CPC ............. *C08L 23/16* (2013.01); *C08F 297/06* (2013.01); *C08L 2205/02* (2013.01)

(58) Field of Classification Search
CPC ...... C08L 23/00; C08L 23/16; C08L 2205/02
USPC .......................... 525/191, 211, 236, 237, 240
See application file for complete search history.

(56) References Cited

U.S. PATENT DOCUMENTS

| | | |
|---|---|---|
| 5,118,773 A | 6/1992 | Takao et al. |
| 5,191,042 A | 3/1993 | Cozewith |
| 5,229,478 A | 7/1993 | Floyd et al. |
| 5,242,971 A | 9/1993 | Nakahama et al. |
| 5,270,407 A | 12/1993 | Takeuchi et al. |
| 5,279,874 A | 1/1994 | Ichikawa et al. |
| 5,571,883 A | 11/1996 | Jourdain et al. |
| 5,656,693 A | 8/1997 | Ellul et al. |
| 5,674,613 A | 10/1997 | Dharmarajan et al. |
| 5,677,382 A | 10/1997 | Tsuji et al. |
| 5,696,213 A | 12/1997 | Schiffino et al. |
| 5,698,651 A | 12/1997 | Kawasaki et al. |
| 5,710,218 A | 1/1998 | Nakahama et al. |
| 5,733,983 A | 3/1998 | Hakuta et al. |
| 5,763,533 A | 6/1998 | Dharmarajan et al. |
| 5,973,017 A | 10/1999 | Okita et al. |
| 6,040,351 A | 3/2000 | Okita et al. |
| 6,140,441 A | 10/2000 | Hakuta et al. |
| 6,153,704 A | 11/2000 | Kodama et al. |
| 6,281,316 B1 | 8/2001 | Wasserman et al. |
| 6,300,447 B1 | 10/2001 | Johoji et al. |
| 6,300,451 B1 | 10/2001 | Mehta et al. |
| 6,319,998 B1 | 11/2001 | Cozewith et al. |
| 6,329,477 B1 | 12/2001 | Harrington et al. |
| 6,384,162 B1 | 5/2002 | Zahalka et al. |
| 6,458,894 B1 | 10/2002 | Kawasaki et al. |
| 6,465,584 B1 | 10/2002 | Evens et al. |
| 6,486,278 B1 | 11/2002 | Schiffino et al. |
| 6,531,546 B2 | 3/2003 | Oka et al. |
| 6,545,088 B1 | 4/2003 | Kolthammer et al. |
| 6,635,727 B1 | 10/2003 | Koda et al. |
| 6,686,419 B2 | 2/2004 | Wouters et al. |
| 6,806,336 B2 | 10/2004 | Ravishankar |
| 7,005,492 B2 | 2/2006 | Sassa |
| 7,135,533 B2 | 11/2006 | Ravishankar |
| 7,163,989 B2 | 1/2007 | Friedersdorf |
| 7,199,189 B2 | 4/2007 | Ravishankar et al. |
| 7,390,866 B2 | 6/2008 | Datta et al. |
| 2008/0033107 A1 | 2/2008 | Wouters et al. |
| 2009/0239014 A1 | 9/2009 | Noguchi et al. |

FOREIGN PATENT DOCUMENTS

| | | |
|---|---|---|
| EP | 0446380 A1 | 9/1991 |
| EP | 0657501 A1 | 6/1995 |
| EP | 0718324 A2 | 6/1996 |
| EP | 0718362 A1 | 6/1996 |
| EP | 0843701 A1 | 5/1998 |
| EP | 1339788 A1 | 9/2003 |
| EP | 1453866 A2 | 9/2004 |
| WO | 03050148 A1 | 6/2003 |
| WO | 2005/090427 A1 | 9/2005 |
| WO | 2008095687 A1 | 8/2008 |

OTHER PUBLICATIONS

PCT/US2010/041943, International Search Report and Written Opinion.
PCT/US2010/041943, International Preliminary Report on Patentability.

*Primary Examiner* — Irina S Zemel
*Assistant Examiner* — Jeffrey Lenihan (57) ABSTRACT

The invention provides a composition comprising a first composition, which first composition comprises the following:
A) a first interpolymer comprising, in polymerized form, ethylene, an α-olefin and a nonconjugated polyene;
B) a second interpolymer comprising, in polymerized form, ethylene, an α-olefin and a nonconjugated polyene; and
wherein the first composition has at least one of the following features: a) an [(ML(1+4, 125° C.))/Mw(conv)]*1000 greater than 0.429 mole/g; b) a Mooney Viscosity (ML, 1+4, 125° C.) greater than, or equal to, 70, and has a low shear viscosity (η at 0.1 rad/sec) less than, or equal to, 100,000 Pa·sec; and c) a Mooney Viscosity (ML(1+4, 125° C.)) greater than, or equal to, 70, and has an [Mw(abs)]/[Mw(conv)] less than 1.2.

19 Claims, 2 Drawing Sheets

POLYMER COMPOSITIONS, METHODS OF MAKING THE SAME, AND ARTICLES PREPARED FROM THE SAME

REFERENCE TO RELATED APPLICATIONS

This application claims the benefit of U.S. Provisional Application No. 61/225,631, filed on Jul. 15, 2009, and fully incorporated herein by reference.

BACKGROUND OF THE INVENTION

Automotive weather-strip applications require a unique balance of properties to qualify as an acceptable product. A polymer formulation must have an excellent mixing rate (MR), and must produce a product with excellent mechanical properties. Formulations based on a unimodal (typically one polymer) EPDM polymer often have unacceptable mixing rates and/or form products with unacceptable mechanical properties. Formulations based on bimodal (two polymers) EPDM blends typically cannot be prepared reproducibly, and lead to additional variability in the polymer formulation and final article. There is a need for EPDM-based formulations that have excellent MR and scorch resistance values, and can be used to form automotive weather-strips with excellent mechanical properties. There is a further need for an EPDM composition that can be used in a free-flowing pellet form for both rapid mixing of the final polymer formulation and a high production rate of the formulation. There is a further need for a composition that can be pelletized for rapid mixing of the pellet in a rubber formulation, for a high production rate of the formulation, and to reduce the thermal history due to high temperature and high shear mixing of unpelletized forms of the formulation.

U.S. Pat. No. 7,199,189 discloses a polymer composition comprising a metallocene catalyzed reactor blend of: a) 10 to 30 weight percent semicrystalline minor component, having 65 to 75 weight percent ethylene derived units; 0 to 10 weight percent diene derived units; and alpha-olefin derived units having 3 to 10 carbon atoms making up the remainder of the minor component; and b) 70 to 90 weight percent amorphous major component, having 60 to 70 weight percent ethylene derived units; 0 to 10 weight percent diene derived units; and alpha olefin derived units having 3 to 10 carbon atoms making up the remainder of the major component. The viscosity of the major component is less than one fourth the viscosity of the minor component, and wherein the blend has a diene content of at least 0.5 weight percent based on the total weight of the blend. However, such blends have relatively high viscosity at high shear rates, and are more difficult to fabricate into parts with complex geometries.

U.S. Pat. No. 6,319,998 discloses a method of making polymer blends using series reactors and a metallocene catalyst. More specifically, this invention relates to making blends of EP (ethylene-propylene) copolymers, in which the blend components differ in any of the following characteristics: 1) composition 2) molecular weight, and 3) crystallinity. This reference discloses propylene-base polymers that typically have lower crosslinking efficiencies with peroxides.

U.S. Pat. No. 5,242,971 discloses ethylene-propylene-diene rubbers having a Mooney viscosity from 50 to 120, and comprising from 90 to 40 percent by weight of a high-molecular weight ethylene-propylene-diene copolymer rubber, having an ethylene content of 73 to 85 mol percent, an intrinsic viscosity [η] of 2.5 to 5.0 dl/g, as measured at 135° C. in decalin, and an iodine value of 15 to 35; and from 10 to 60 percent by weight of a low-molecular-weight ethylene-propylene-diene copolymer rubber, having an ethylene content of 73 to 85 mol percent, an intrinsic viscosity [η] of 0.15 to 0.8 dl/g, as measured at 135° C. in decalin, and an iodine value of 15 to 35. The components of the rubber are melt blended using temperatures up to 170° C. This significant thermal history causes less reproducibility in the rheological behavior and crosslinking behavior of the rubber.

U.S. Pat. No. 6,040,351 discloses compositions containing the following: (A) a low-molecular weight ethylene-propylene-5-ethylidene-2-norbornene terpolymer, having a Mooney viscosity from 20 to 40, an ethylene/propylene ratio by weight from 65/35 to 50/50, an iodine value from 20 to 30, and a Q value (Mw/Mn) not exceeding 3, as determined by gel permeation chromatography; (B) a high-molecular ethylene-propylene-5-ethylidene-2-norbornene terpolymer having a Mooney viscosity from 100 to 300, an ethylene/propylene ratio by weight from 65/35 to 50/50, an iodine value from 20 to 30, and a Q value (Mw/Mn) from 6 to 10; (C) a vulcanizing agent containing sulfur as a vulcanizer, and zinc carbamate and sulfenamide as accelerators; and (D) a foaming agent containing N,N'-dinitrosopentamethylenetetramine and urea. The components of the rubber are melt blended using temperatures up to 170° C. This significant thermal history induces a higher degree of variation in the rheological behavior and crosslinking behavior of the rubber. Also, the broader molecular weight distribution of the high molecular weight component will tend to lower the crosslinking efficiency of the rubber.

U.S. Pat. No. 5,973,017 discloses a foamed rubber blend comprising an EPDM blend, comprising at least one high molecular weight component and at least one low molecular weight component. The high molecular weight component has a weight average molecular weight (Mw) from 400,000 to 800,000, and a molecular weight distribution index (Mw/Mn) from 5.5 to 9.5. The low molecular weight component has a weight average molecular weight (Mw) from 150,000 to 500,000, and a molecular weight distribution index (Mw/Mn) from 1.5 to 5.5. The EPDM rubber has an overall weight average molecular weight (Mw) from 200,000 to 700,000. The ratio of the polymer blend in the foamed rubber blend is in a range of from 33 weight percent to 60 weight percent. The very high molecular weight component of the blend will tend to result in more limited processibility of the blend, and will reduce the crosslinking efficiency of the blend due to its broad molecular weight distribution.

U.S. Pat. No. 6,531,546 (see also EP 1186631A1) discloses a rubber composition comprising (a) a low molecular weight copolymer rubber, which is an ethylene/α-olefin/non-conjugated diene copolymer rubber having a limiting viscosity [η] of 0.4-1.6 dl/g, measured in decalin at 135° C., and an ethylene content of 40-60 weight percent; and (b) a high molecular weight copolymer rubber, which is an ethylene/α-olefin/non-conjugated diene copolymer rubber having a Mooney viscosity (ML 1+4, 100° C.) of 60-150, an ethylene content of 60-80 weight percent, and an iodine number of 5-35. The rubber composition has a Mooney viscosity (ML 1+4, 100° C.) of 20-50. These low viscosity blends would have limited oil extension and limited filler extension. The crosslinking efficiency would also be reduced. The ethylene/α-olefin/non-conjugated diene copolymer rubber having a limiting viscosity [η] of the above range of "0.4-1.6 dl/g" has a Mooney viscosity (ML1+4, 100° C.) of 19 or less. It is widely know that the measured Mooney viscosity of a polymer generally decreases with increase in measurement temperature. Thus, the Mooney viscosity of a polymer measured at 125° C. (ML1+4, 125° C.) is generally lower than the Mooney viscosity measured at 100° C. (ML1+4, 100° C.).

Additional EPDM blends and/or methods of preparing rubber blends are disclosed in U.S. Pat. No. 5,191,042; U.S. Pat. No. 5,229,478; U.S. Pat. No. 6,153,704; U.S. Pat. No. 6,329,477; and European Patent Application No. EP 0446380A1.

As discussed above, there remains a need for EPDM-based formulations that can be used to form weather-strips with excellent mechanical properties with a high degree of consistency. These formulations should be usable in free-flowing pellet form for both rapid mixing of the final polymer formulation and a high production rate of the formulation. These needs and others have been met by the following invention.

SUMMARY OF THE INVENTION

The invention provides a composition comprising a first composition, which comprises the following:

A) a first interpolymer comprising, in polymerized form, ethylene, an α-olefin and a nonconjugated polyene;

B) a second interpolymer comprising, in polymerized form, ethylene, an α-olefin and a nonconjugated polyene; and wherein the first composition has an [(ML(1+4, 125° C.))/Mw(conv)]*1000 greater than 0.429 mole/g.

The invention also provides a composition comprising a first composition, which comprises the following:

A) a first interpolymer comprising, in polymerized form, ethylene, an α-olefin and a nonconjugated polyene;

B) a second interpolymer comprising, in polymerized form, ethylene, an α-olefin and a nonconjugated polyene; and wherein the first composition has a Mooney Viscosity (ML, 1+4, 125° C.) greater than, or equal to, 70, and has a low shear viscosity (η at 0.1 rad/sec) less than, or equal to, 100,000 Pa·sec.

The invention also provides a composition comprising a first composition, which comprises the following:

A) a first interpolymer comprising, in polymerized form, ethylene, an α-olefin and a nonconjugated polyene;

B) a second interpolymer comprising, in polymerized form, ethylene, an α-olefin and a nonconjugated polyene; and wherein the first composition has a Mooney Viscosity (ML (1+4, 125° C.)) greater than, or equal to, 70, and has an [Mw(abs)]/[Mw(conv)] less than 1.2.

DETAILED DESCRIPTION OF THE INVENTION

As discussed above, the invention provides a composition comprising a first composition, which comprises the following:

A) a first interpolymer comprising, in polymerized form, ethylene, an α-olefin and a nonconjugated polyene;

B) a second interpolymer comprising, in polymerized form, ethylene, an α-olefin and a nonconjugated polyene; and wherein the first composition has an [(ML(1+4, 125° C.))/Mw(conv)]*1000 greater than 0.429 mole/g, preferably greater than 0.45 mole/g.

The invention also provides a composition comprising a first composition, which comprises the following:

A) a first interpolymer comprising, in polymerized form, ethylene, an α-olefin and a nonconjugated polyene;

B) a second interpolymer comprising, in polymerized form, ethylene, an α-olefin and a nonconjugated polyene; and wherein the first composition has a Mooney Viscosity (ML, 1+4, 125° C.) greater than, or equal to, 70, and has a low shear viscosity (η at 0.1 rad/sec) less than, or equal to, 100,000 Pa·sec.

The invention also provides a composition comprising a first composition, which comprises the following:

A) a first interpolymer comprising, in polymerized form, ethylene, an α-olefin and a nonconjugated polyene;

B) a second interpolymer comprising, in polymerized form, ethylene, an α-olefin and a nonconjugated polyene; and wherein the first composition has a Mooney Viscosity (ML (1+4, 125° C.)) greater than, or equal to, 70, and has an [Mw(abs)]/[Mw(conv)] less than 1.2, preferably less than 1.1.

In one embodiment, the first composition has a molecular weight distribution (MWD) less than 3.0, preferably less than 2.8, and more preferably less than 2.5. In a further embodiment, the MWD is derived from conventional GPC. In another embodiment, the MWD is derived from absolute GPC.

In a preferred embodiment, first interpolymer differs in one or more features, such as amount of a monomeric constituent, density, crystalline melting point (Tm), Mooney viscosity, or a molecular weight (Mn, Mw), from the second interpolymer.

In one embodiment, the first interpolymer has a molecular weight distribution (MWD) less than 3.0, preferably less than 2.8. In a further embodiment, the MWD is derived from conventional GPC. In another embodiment, the MWD is derived from absolute GPC.

In one embodiment, the second interpolymer has a molecular weight distribution (MWD) less than 3.0, preferably less than 2.8, more preferably less than 2.4. In a further embodiment, the MWD is derived from conventional GPC. In another embodiment, the MWD is derived from absolute GPC.

In one embodiment, the first interpolymer and the second polymer, each has a molecular weight distribution (MWD) less than 3.0, preferably less than 2.8, more preferably less than 2.4. In a further embodiment, the MWD is derived from conventional GPC. In another embodiment, the MWD is derived from absolute GPC.

In one embodiment, the first composition has an [(ML(1+4, 125° C.))/Mz(BB)]*1000 greater than 0.23, preferably greater than 0.25, and more preferably greater than 0.27 mole/g.

In one embodiment, the ratio of the weight average molecular weight of the first interpolymer to the weight average molecular weight of the second interpolymer, $M_{w(conv, first)}/M_{w(conv, second)}$, is greater than 1.05, preferably greater than 1.10, and more preferably greater than 1.15, and even more preferably greater than 1.20.

In one embodiment, the ratio of the polyene content in the second interpolymer to the polyene content in the first interpolymer (polyene (2)/polyene (1)) is greater than 1.0, preferably greater than 1.1, and more preferably greater than 1.2.

In one embodiment, the ratio of the polyene content in the second interpolymer to the polyene content in the first interpolymer (polyene (2)/polyene (1)) is less than 3.0, preferably less than 2.0, and more preferably less than 1.5.

In one embodiment, the difference (absolute) in the polyene content of the second interpolymer and the first interpolymer (polyene (2)−polyene (1)) is greater than 0.3 weight percent, preferably greater than 0.5 weight percent, more preferably greater than 1.0 weight percent, and even more preferably greater than 1.2 weight percent.

In one embodiment, the difference (absolute) in the polyene content of the second interpolymer and the first interpolymer (polyene (2)−polyene (1)) is less than 2.0 weight percent, preferably less than 1.8 weight percent, more preferably less than 1.6 weight percent.

In one embodiment, the difference (absolute) in the polyene content of the second interpolymer and the polyene content of the first interpolymer (polyene (2)−polyene (1)) is less than 5 weight percent, preferably less than 4 weight percent, and more preferably less than 3 weight percent.

In one embodiment, the total polyene content is less than, or equal to, 8 weight percent, preferably less than, or equal to, 7 weight percent, based on the sum weight of the first interpolymer and second interpolymer.

In one embodiment, the first interpolymer comprises from 2.8 to 5.5 weight percent, preferably from 3.5 to 5.5 weight percent of the polyene, based on the weight of the interpolymer.

In one embodiment, the first interpolymer comprises from 2.8 to 4.5 weight percent, preferably from 3.5 to 4.5 weight percent of the polyene, based on the weight of the interpolymer.

In one embodiment, the second interpolymer comprises from 4.5 to 9 weight percent, preferably from 4.8 to 8 weight percent, and more preferably from 5 to 6.9 weight percent of the polyene, based on the weight of the interpolymer.

In one embodiment, the second interpolymer comprises from 5 to 6 weight percent of the polyene, based on the weight of the interpolymer.

In one embodiment, the first interpolymer comprises, in polymerized form, from 60 to 70 weight percent ethylene, preferably from 62 to 66 weight percent ethylene, based on the weight of the interpolymer.

In one embodiment, the second interpolymer comprises, in polymerized form, from 64 to 80 weight percent ethylene, preferably from 66 to 76 weight percent ethylene, more preferably 68 to 73 based on the weight of the interpolymer.

In one embodiment, the ratio of the ethylene content in the second interpolymer to the ethylene content in the first interpolymer, EE(2)/EE(1) is greater than, or equal 1.05, preferably greater than, or equal to, 1.1, more preferably greater than, or equal to, 1.2.

In one embodiment, the difference in ethylene content in the first and second interpolymers is greater than, or equal to, 2 weight percent, preferably greater than, or equal to, 4 weight percent, as determined by the weight of each interpolymer.

In one embodiment, the difference in ethylene content in the first and second interpolymers is greater than, or equal to, 6 weight percent, preferably greater than, or equal to, 8 weight percent, as determined by the weight of each interpolymer.

In one embodiment, the first interpolymer has a Mooney viscosity (ML, 1+4, 125° C.) greater than 40, preferably greater than 45.

In one embodiment, the second interpolymer has a Mooney viscosity (ML, 1+4, 125° C.) greater than 40, preferably greater than 45.

In one embodiment, the first interpolymer has a Mooney viscosity (ML, 1+4, 125° C.) greater than 40, preferably greater than 45, and the second interpolymer has a Mooney viscosity (ML, 1+4, 125° C.) greater than 35, preferably greater than 40, more preferably greater than 45.

In one embodiment, the ratio of the Mooney viscosities (ML, 1+4, 125° C.) of the first and second interpolymers (ML(first)/ML(second)) is less than 2.5, preferably less than 2.2.

In one embodiment, the first composition has a Mooney viscosity (ML, 1+4, 125° C.) greater than, or equal to, 70, preferably greater than, or equal to, 75, and more preferably greater than, or equal to, 80.

In one embodiment, the first composition comprises 40 to 50 weight percent of the first interpolymer, and 60 to 50 weight percent of the second interpolymer, and wherein each weight percentage is based on the sum weight of the first interpolymer and the second interpolymer.

In one embodiment, the first composition comprises 43 to 47 weight percent of the first interpolymer, and 57 to 53 weight percent of the second interpolymer, and wherein each weight percentage is based on the sum weight of the first interpolymer and the second interpolymer.

In one embodiment, the first interpolymer has a weight average molecular weight (Mw(conv)) less than, or equal to, 320,000 g/mole.

In one embodiment, the first polymer has a weight average molecular weight (Mw(conv)) from 170,000 to 300,000 g/mole.

In one embodiment, the first polymer has a weight average molecular weight (Mw(conv)) from 180,000 to 280,000 g/mole, preferably from 190,000 to 250,000 g/mole.

In one embodiment, the first composition has a weight average molecular weight (Mw(conv)) from 150,000 to 230,000 g/mole, preferably from 170,000 to 230,000 g/mole.

In one embodiment, the first composition comprises greater than 85 weight percent, preferably greater than 90 weight percent, and more preferably greater than 95 weight percent, of the first and second interpolymers, based on the weight of the first composition.

In a further embodiment, the composition comprises greater than 85 weight percent, preferably greater than 90 weight percent, and more preferably greater than 95 weight percent, of the first composition, based on the weight of the composition.

In one embodiment, the first interpolymer and the second interpolymer are prepared sequentially in at least two reactors. In a further embodiment, the first interpolymer is prepared first, in a first reactor, and then the second interpolymer is prepared in a second reactor. In another embodiment, the second interpolymer is prepared first, in a first reactor, and then the first interpolymer is prepared in a second reactor.

In one embodiment, the first interpolymer is an EPDM(1), and the second interpolymer is an EPDM(2). In a further embodiment, the diene in EPDM(1) is 5-ethylidene-2-norbornene (ENB), and the diene in EPDM(2) is 5-ethylidene-2-norbornene (ENB).

In one embodiment, the composition further comprises at least one additive selected from fillers, crosslinking agents, foaming agents, or combinations thereof.

In one embodiment, the composition is in free-flowing pellet form (at ambient conditions).

An inventive composition may comprise a combination of two or more embodiments as described herein.

A first composition may comprise a combination of two or more embodiments as described herein.

The first interpolymer may comprise a combination of two or more embodiments as described herein.

The second interpolymer may comprise a combination of two or more embodiments as described herein.

The invention also provides an article comprising at least one component formed from an inventive composition. In a further embodiment, the article is a foamed profile extruded article. In a further preferred embodiment, the article is a weather-strip. In another embodiment, the article is an automotive part. In another embodiment, the article is a hose. In another embodiment, the article is a flooring material. In another embodiment, the article is a thermoplastic vulcanizate (TPV). In another embodiment, the article is a footwear component, such a shoe inner sole or shoe outer sole.

The invention also provides a foam formed from an inventive composition.

The invention also provides an article comprising at least one component formed from an inventive foam. In a further embodiment, the article is a weather-strip.

An inventive foam may comprise a combination of two or more embodiments as described herein.

An inventive article may comprise a combination of two or more embodiments as described herein.

First Composition

Additional embodiments of the first composition are discussed below. A first composition may have a combination of two or more embodiments as discussed herein.

The first composition is preferably prepared in a dual reactor solution polymerization. In a further embodiment, the first reactor polymer has a 170,000 g/mole minimum weight average molecular weight, and the second reactor polymer has a 130,000 g/mole minimum weight average molecular weight. The amount of polyene (for example, ENB) can be tailored in each reactor to minimize the ENB content overall, which will provide a first composition with improved scorch resistance. It is also preferred that the first composition be manufactured into a free-flow pellet form.

In one embodiment, the first composition has a Mooney viscosity (ML, 1+4, 125° C.) of at least 70, and a ratio "ML (1+4, 125° C.)/Mw(Conv)*1000">0.429.

In one embodiment, the first composition has a Mooney viscosity (ML, 1+4, 125° C.) of at least 75, and a ratio "ML (1+4, 125° C.)/Mz(Abs)*1000">0.220.

In one embodiment, the first composition has a Mooney viscosity (ML, 1+4, 125° C.) of at least 75, and a ratio "ML (1+4, 125° C.)/Mz(BB)*1000">0.257.

In one embodiment, the first composition has a Mooney viscosity (ML, 1+4, 125° C.) of at least 35.

In one embodiment, the weight average molecular weights of the first and second interpolymers meet the following relationship: 1.05<Mw(first)/Mw(second)<3, and preferably 1.1<Mw(first)/Mw(second)<2.

In one embodiment, the first composition has a ratio, Mw(abs)/Mw(Conv), less than 1.3, preferably less than 1.2, more preferably less than 1.1, and even more preferably less than 1.05.

In one embodiment, the first composition has a ratio, Mz+1(BB)/Mn(abs), less than 7.1, preferably less than 6.9, and more preferably less than 6.7.

Ethylene/α-Olefin/Polyene Interpolymers

The first and second ethylene/α-olefin/nonconjugated polyene interpolymers have polymerized therein C2 (ethylene), at least one α-olefin and a nonconguated polyene. Suitable examples of α-olefins include the C3-C20 α-olefins. Suitable examples of nonconjugated polyenes include the C4-C40 nonconjugated polyenes. In a preferred embodiment, the interpolymer is an ethylene/propylene/diene interpolymer, and further an EPDM terpolymer. In a further embodiment, the diene is ENB.

The α-olefin may be either an aliphatic or an aromatic compound, and may contain vinylic unsaturation or a cyclic compound, such as styrene, p-methyl styrene, cyclobutene, cyclopentene, and norbornene, including norbornene substituted in the 5 and 6 positions with C1-C20 hydrocarbyl groups. The α-olefin is preferably a C3-C20 aliphatic compound, preferably a C3-C16 aliphatic compound, and more preferably a C3-C10 aliphatic compound. Preferred ethylenically unsaturated monomers include 4-vinylcyclohexene, vinylcyclohexane, and C3-C10 aliphatic α-olefins (especially propylene, isobutylene, 1-butene, 1-pentene, 1-hexene, 3-methyl-1-pentene, 4-methyl-1-pentene, 1-octene, 1-decene and 1-dodecene), and more preferably C3-C10 aliphatic α-olefins. A more preferred C3-C10 aliphatic α-olefin is selected from the group consisting of propylene, 1-butene, 1-hexene and 1-octene, and more preferably propylene. In a preferred embodiment, the interpolymer is an EPDM interpolymer. In a further embodiment, the diene is 5-ethylidene-2-norbornene (ENB).

In one embodiment, the nonconjugated polyene is a C6-C15 straight chain, branched chain or cyclic hydrocarbon diene. Illustrative nonconjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

The ethylene/α-olefin/nonconjugated polyene interpolymers are prepared in the presence of a single site catalyst, such as a constrained geometry catalyst (CGC), for example, a monocyclopentadienyl titanium complex; or a post metallocene catalyst.

In a preferred embodiment, the first ethylene/α-olefin/nonconjugated polyene interpolymer comprises a majority amount of polymerized ethylene, based on the weight of the interpolymer.

In a preferred embodiment, the second ethylene/α-olefin/nonconjugated polyene interpolymer comprises a majority amount of polymerized ethylene, based on the weight of the interpolymer.

In one embodiment of the invention, the first ethylene/α-olefin/nonconjugated polyene interpolymer has a molecular weight distribution ($M_{w(Conv)}/M_{n(Conv)}$) from 2 to 3, preferably from 2.05 to 2.8 and more preferably from 2.05 to 2.5, and even more preferably from 2.05 to 2.25. All individual values and subranges from 2 to 3 are included herein and disclosed herein. In a preferred embodiment, the interpolymer is an ethylene/propylene/diene interpolymer, and further an EPDM terpolymer. In a further embodiment, the diene is ENB.

In one embodiment, the first ethylene/α-olefin/nonconjugated polyene interpolymer has a Mooney viscosity, ML(1+4) at 125° C., greater than 70, preferably greater than 75, more preferably greater than 80. In a preferred embodiment, the interpolymer is an ethylene/propylene/diene interpolymer, and further an EPDM terpolymer. In a further embodiment, the diene is ENB.

In one embodiment, the first ethylene/α-olefin/nonconjugated polyene interpolymer has a Mooney viscosity, ML(1+4) at 125° C., less than 200, preferably less than, or equal to, 160, more preferably less than, or equal to, 120. In a preferred embodiment, the interpolymer is an ethylene/propylene/diene interpolymer, and further an EPDM terpolymer. In a further embodiment, the diene is ENB.

Mooney viscosity is that of the neat interpolymer (or calculated viscosity of neat polymer for polymers that contain a filler, such as carbon black, and/or an oil). The neat polymer refers to the polymer without filler and without oil.

In one embodiment, the first ethylene/α-olefin/nonconjugated polyene interpolymer has a $Mn_{(conv)}$ from 50,000 to 120,000 g/mole, preferably from 80,000 to 100,000 g/mole.

In one embodiment, the first ethylene/α-olefin/nonconjugated polyene interpolymer has a $Mw_{(conv)}$ from 150,000 to 280,000 g/mole, preferably from 180,000 to 280,000 g/mole.

An ethylene/α-olefin/nonconjugated polyene interpolymer may comprise a combination of two or more embodiments as described herein.

An ethylene/alpha-olefin/diene interpolymer may comprise a combination of two or more embodiments as described herein.

An ethylene/propylene/diene terpolymer may comprise a combination of two or more embodiments as described herein.

Additives

An inventive composition may comprise one or more additives. Suitable additives include, but are not limited to, fillers, antioxidants, UV stabilizers, vulcanizing agents, foaming agents, flame retardants, plasticizers or oils, colorants or pigments, and combinations thereof. In one embodiment, the composition comprises at least one additive selected from fillers, antioxidants, UV stabilizers, vulcanizing agents, foaming agents, plasticizers or oils, or combinations thereof.

Fillers include, but are not limited to, carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; phenol-formaldehyde, polystyrene, and poly(alphamethyl)-styrene resins, natural fibers, synthetic fibers, and the like. In one embodiment, the filler is carbon black.

Plasticizers include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

Antioxidants and antiozonants include, but are not limited to, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

Foaming agents useful in making the resulting foam structure include, but are not limited to, decomposable chemical foaming agents. Such chemical foaming agents decompose at elevated temperatures to form gases or vapors to blow the polymer into foam form. The agent preferably takes a solid form, so it is conveniently dry-blended with the polymer material. Chemical blowing agents include, but are not limited to, azodicarbonamide, azodiisobutyro-nitrile, barium azodicarboxylate, N,N'-dimethyl-N,N'-dinitrosoterephthalamide, N,N'-dinitrosopentamethylenetetramine, benzenesulfonhydrazide, 4,4-oxybenzene sulfonyl semicarbazide, p-toluene sulfonyl semicarbazide, p,p'-oxybis-(benzenesulfonyl hydrazide), 3,3'-disulfonhydrazide-diphenylsulfone, azobisisobutyronitrile, azobisformamide and the like. In one embodiment, the blowing agent is azodicarbonamide. These foaming agents may be used alone or in admixture of two or more. In one embodiment, the foaming agent is an inorganic foaming agent, such as ammonium carbonate, sodium bicarbonate, anhydrous sodium nitrate and the like.

Vulcanizing agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy)hexane, di-(tertbutylperoxyisopropyl)benzene, tertbutyl peroxybenzoate and 1,1-di-(tertbutylperoxy)-3,3,5-trimethylcyclohexane; metal oxides, such as zinc, magnesium, and lead oxides; dinitroso compounds, such as p-quinone-dioxime and p,p'-dibenzoylquinone-dioxime; and phenol-formaldehyde resins containing hydroxymethyl or halomethyl functional groups. The suitability of any of these vulcanizing agents for use in the invention will be largely governed by the choice of polymers, as is well known to those skilled in the compounding art. Sulfur can be a crystalline elemental sulfur or an amorphous elemental sulfur, and either type can be in pure form or supported on an inert carrier. An example of a supported sulfur is Rhenogran S-80 (80 percent S and 20 percent inert carrier) from Rhein Chemie.

In one embodiment of the invention, the sulfur containing compounds and the peroxides are the preferred vulcanizing agents, and the sulfur containing compounds are most preferred. It is understood that mixtures of these vulcanizing agents can be employed, though this is generally not preferred. The amount of the vulcanizing agent can range from 1 to 10 parts by weight, based upon 100 parts of the polymers in the composition.

Vulcanization temperatures and time employed are typical. Temperatures ranging from 250° F. to 440° F., and times ranging from one minute to 120 minutes can be employed.

Additional additives include other polymers, including, but not limited to, ethylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

Some commercial examples of suitable ethylene-base interpolymers include commercially available HDPE, commercially available LDPE, ATTANE, AFFINITY, DOWLEX, FLEXOMER, ELITE, all available from The Dow Chemical Company; and EXCEED and EXACT available from Exxon-Mobil Chemical Company.

The olefin multi-block interpolymers and their preparation and use, are described in WO 2005/090427, US2006/0199931, US2006/0199930, US2006/0199914, US2006/0199912, US2006/0199911, US2006/0199910, US2006/0199908, US2006/0199907, US2006/0199906, US2006/0199905, US2006/0199897, US2006/0199896, US2006/0199887, US2006/0199884, US2006/0199872, US2006/0199744, US2006/0199030, US2006/0199006 and US2006/0199983; each publication is fully incorporated herein by reference.

Applications

The compositions of the present invention may be used to prepare any of a variety of articles, or their component parts or portions. The inventive compositions are especially suited for foamed, crosslinked extruded profile applications, including weather strip applications. The inventive compositions may be converted into a finished article of manufacture by any one of a number of conventional processes and apparatus. Illustrative processes include, but are not limited to, extrusion, calendering, injection molding, compression molding, and other typical thermoplastic processes. For example, articles can be prepared by injection molding, extrusion, extrusion followed by thermoforming, low pressure molding, compression molding, and the like.

Articles include, but are not limited to, foams, weather strips, belts, hoses, wire and cable jacketing, tubes, flooring materials, gaskets, membranes, molded goods, extruded parts, and adhesives (for example, high viscosity adhesives). Additional articles includes polymer sheets, fibers, coatings, automotive parts (for example, tires and tire components), computer parts, building materials, household appliances, electrical supply housings, trash cans, storage or packaging containers, lawn furniture strips or webbing, lawn mower, garden hose, and other garden appliance parts, refrigerator gaskets, acoustic systems, utility cart parts, desk edging, toys and water craft parts. The compositions can also be used in roofing applications, such as roofing membranes. The compositions can further be used in fabricating a footwear component, including, but not limited to, a shaft for a boot, particularly an industrial work boot. The compositions can also be used in fabricating automotive parts. A skilled artisan can readily augment this list without undue experimentation.

DEFINITIONS

The term "composition," as used herein, includes a mixture of materials, which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "phr," as used herein, is in reference to weight of a compositional component relative to hundred parts of the one or more ethylene/α-olefin/nonconjugated polyene interpolymers.

The term "parts," in reference to an amount of a component, refers to the weight parts of a component in a composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

TEST METHODS

Mooney Viscosity

Interpolymer MV (ML1+4 at 125° C.) is measured in accordance with ASTM 1646-04, with a one minute preheat time and a four minute rotor operation time. The instrument is an Alpha Technologies Rheometer MDR 2000.

For dual reactor polymerizations in series, the Mooney viscosity of the second reactor component is determined by the following equation: log ML=n(A)log ML(A)+n(B)log ML(B); where ML is the Mooney viscosity of the final reactor product, ML(A) is the Mooney viscosity of the first reactor polymer, ML(B) is the Mooney viscosity of the second reactor polymer, n(A) is the weight fraction of the first reactor polymer, and n(B) is the weight fraction of the second reactor polymer. Each measured Mooney viscosity is measured as discussed above. The weight fraction of the second reactor polymer is determined as follows: n(B)=1−n(A), where n(A) is determined by the known mass of first polymer transferred to the second reactor.

Gel Permeation Chromatography (GPC)

Polymer molecular weight was characterized by high temperature triple detector gel permeation chromatography (3D-GPC). The chromatographic system consisted of a Polymer Laboratories (Amherst, Mass., now part of Varian, Inc, Shropshire, UK) "PL-GPC 210" high temperature chromatograph, equipped with a concentration detector (RI), a Precision Detectors (Amherst, Mass.) 2-angle laser light scattering detector, Model 2040, and a 4-capillary differential viscometer detector, Model 220, from Viscotek (Houston, Tex.). The 15° angle of the light scattering detector was used for calculation purposes.

Data collection was performed using VISCOTEK TriSEC software version 3, and a 4-channel VISCOTEK Data Manager DM400. The system was equipped with an on-line ERC-3415α four channel degasser system from ERC Inc (Tokyo, JP). The carousel compartment was operated at 150° C. for polyethylene and 85° C. for EPDM, and the column compartment was operated at 150° C. The columns were four Polymer Lab Mix-A 30 cm, 20 micron columns. The polymer solutions are prepared 1,2,4-trichlorobenzene (TCB). The samples were prepared at a concentration of "0.1 grams of polymer in 50 ml of TCB." The chromatographic solvent and the sample preparation solvent contained 200 ppm of butylated hydroxytoluene (BHT). Both solvent sources were nitrogen purged. Polyethylene samples were stirred gently at 160° C. for four hours. EPDM samples were stirred gently at 160° C. for one hour. For carbon black containing samples, carbon black was removed by an one-time filtration that was performed at 150° C., under nitrogen pressurized flow through a pre-heated layer of PERLITE in a ceramic filter. The injection volume was 200 μl, and the flow rate was 1.0 ml/minute.

Calibration of the GPC column set was performed with 21 narrow molecular weight distribution polystyrene standards. The molecular weights of the standards ranged from 580 to 8,400,000, and were arranged in 6 "cocktail" mixtures, with at least a decade of separation between individual molecular weights. The polystyrene standard peak molecular weights were converted to polyethylene molecular weights using the following equation (as described in Williams and Ward, J. Polym. Sci., Polym. Let., 6, 621 (1968)): Mpolyethylene=A× (Mpolystyrene)$^B$ (1A), where M is the molecular weight, A has a value of 0.39 and B is equal to 1.0. A fourth order polynomial was used to fit the respective polyethylene-equivalent calibration points.

The total plate count of the GPC column set was performed with EICOSANE (prepared at 0.04 g in 50 milliliters of TCB, and dissolved for 20 minutes with gentle agitation.) The plate count and symmetry were measured on a 200 microliter injection according to the following equations:

PlateCount=5.54*(RV at Peak Maximum/(Peak width at ½ height))^2   (2A), where RV is the retention volume in milliliters, and the peak width is in milliliters.

Symmetry=(Rear peak width at one tenth height−RV at Peak maximum)/(RV at Peak Maximum−Front peak width at one tenth height)   (3A), where RV is the retention volume in milliliters, and the peak width is in milliliters.

The Systematic Approach for the determination of multi-detector offsets was done in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)). Optimizing dual detector log molecular weight results from a broad polyethylene of 115,000 to the narrow standard column calibration results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used for the determination of the molecular weight, was obtained from the sample refractive index increment area, and the RI detector calibration from a linear polyethylene homopolymer of 115,000 Dalton molecular weight. The refractive index increment (dn/dc) for polyethylene is −0.104 mL/g and dn/dc for EODM is −0.094 mL/g. The chromatographic concentrations were assumed low enough to eliminate addressing 2nd Virial coefficient effects (concentration effects on molecular weight).

The calculations of Mn, Mw, and Mz based on GPC (conventional GPC for Mn, Mw and Mz) results using the RI detector were determined from the following equations:

$$\overline{Mn} = \frac{\sum_i RI_i}{\sum_i \left(\frac{RI_i}{M_{calibration_i}}\right)}, \quad (4A)$$

$$\overline{Mw} = \frac{\sum_i (RI_i * Mcal_i)}{\sum_i RI_i}, \quad (5A)$$

$$\overline{Mz} = \frac{\sum_i (RI_i * Mcal_i^2)}{\sum_i (RI_i * Mcal_i)}. \quad (6A)$$

Another form of molecular weight average is the viscosity average which can be calculated using Equation 7A:

$$\overline{Mz} = \left(\frac{\sum_i (RI_i * Mcal_i^{\alpha+1})}{\sum_i (RI_i)}\right)^{1/\alpha}, \quad (7A)$$

where α is a material dependent parameter which relates the intrinsic viscosity ([η]) to the molecular weight of the polymer.

In addition to the above calculations, a set of alternative values [Mw(abs), Mz(abs), Mz (BB) and $M_{z+1}$ (BB)] values were also calculated with the method proposed by Yau and Gillespie, Polymer, 42, 8947-8958 (2001), and determined from the following equations:

$$\overline{Mw}(abs) = K_{LS} * \frac{\sum_i (LS_i)}{\sum_i (IR_i)}, \quad (8A)$$

where, $K_{LS} = LS - MW$ calibration constant, $$\overline{Mz}(abs) = \frac{\sum_i RI_i * (LS_i / RI_i)^2}{\sum RI_i * (LS_i / RI_i)}, \quad (9A)$$

$$\overline{Mz}(BB) = \frac{\sum_i (LS_i * Mcalibration_i)}{\sum_i (LS_i)}, \quad (10A)$$

$$\overline{M_{Z+1}}(BB) = \frac{\sum_i (LS_i * Mcalibration_i^2)}{\sum_i (LS_i * Mcalibration_i)}, \quad (11A)$$

where LS, is the 15 degree LS signal, and the Mcalibration uses equation 1A, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak." A flow rate marker was therefore established based on the air peak in TCB or a drop of decane flow marker dissolved in the eluting sample prepared in TCB. Flow rate marker was used to linearly correct the flow rate for all samples by alignment of the air peaks or decane peaks. Any changes in the time of the marker peak are then assumed to be related to a linear shift in both flow rate and chromatographic slope.

The plate count for the chromatographic system (based on EICOSANE as discussed previously) should be greater than 22,000, and symmetry should be between 1.00 and 1.12.

Method for Determination of Non-Conjugated Polyenes in an Ethylene/α-Olefin/Polyene Interpolymer by NMR The ethylene and non-conjugated polyene contents of an interpolymer comprising ethylene, an α-olefin and a non-conjugated polyene can be determined by 13C or 1H Nuclear Magnetic Resonance (NMR) spectroscopy. For example, the 1H NMR spectra can be obtained via a Varian XL-400 NMR spectrometer, operating in Fourier Transform mode, with the following instrument conditions: pulse angle, 40°; acquisition time, 0.7 sec; pulse delay, 5.0 sec; spectral width, 12,000 Hz, and number of transient accumulated, 200.

Samples are dissolved in deuterated chloroform, at room temperature, at a concentration of 1-2 weight percent, based on the total weight of the solution. For the determination of the ethylene content, the integrals of the methyl region (chemical shift delta versus tetramethysilane=0.88 ppm to 0.94 ppm) and the methylene region and methine region (delta=1.10 ppm to 1.54 ppm) can be employed. Similarly, if the α-olefin is propylene, the propylene content can also be determined from the resolved methyl spectral peak.

The non-conjugated polyene content can be determined from the integral of the peak for the olefinic protons occurring at around 5 ppm, and the methylene, methyl and methine regions are corrected for the presence of the non-conjugated polyene units incorporated in the polymer. For example, when the diene is ENB, the diene content is determined from the integral of the peak for olefinic protons occurring at about 5.28 and 5.02 ppm (for cis- and trans-methine protons of =CH—CH3, respectively), and the methylene, methyl and methine regions are corrected for the presence of incorporated ENB. If the non-conjugated polyene is another kind, characteristic NMR spectral shift(s) can be resolved, and the integral of the chemical shift regions can be obtained. In addition, unincorporated non-conjugated polyene, if present, can be distinguished by the presence of vinyl protons. In this way, the proton analysis is capable of yielding unambiguous values for the contents of ethylene, α-olefin, such as propylene, and diene incorporated in the polymer.

Similarly, the content of the non-conjugated polyene an interpolymer comprising ethylene, an α-olefin and a non-conjugated polyene can also be determined using 13C NMR and other spectroscopic methods.

Additional spectroscopic methods are described in the following references, each fully incorporated herein by reference.

1. Yasuyuki Tanaka, Hisaya Sato, Yukio Ozeki, Masaru Ikeyama and Takefumi Sato, "Determination of unsaturation in ethylene-propylene terpolymers and butyl rubber by time-averaged 1H n.m.r. measurements", Polymer, 16(10) (1975), 709-713.
2. U.S. Pat. No. 5,229,478, "Process for production of high molecular weight EPDM elastomers using a metallocene-alumoxane catalyst system", Jul. 20, 1993 (http://www-.freepatentsonline.com/5229478.html).
3. W. Heinena, L. N. Ballijnsa, W. J. A. Wittenburga, R. Wintersa, J. Lugtenburga, M. van Duinb, "Synthesis and characterization of carbon-13 labelled 2-ethylidene-5-norbornene containing EPDM rubber. Observation of crosslinking and oxidation", Polymer 40 (1999) 4353-4363.
4. Harry J. A. Philipsen, "Determination of chemical composition distributions in synthetic polymers", Journal of Chromatography A, 1037 (2004) 329-350.
5. S. DiMartino and M. Kelchtermans, Determination of the composition of ethylene-propylene-rubbers using 13C-NMR spectroscopy, J. Appl. Poly. Sci. 56(13) (2003) 1781-1787.
6. Hayashi, T., Inoue, Y., Chujo, R., "Ethylene-Propylene Copolymerization Mechanism Based on the Sequence Distributions Determined by 13C NMR Spectra", Macromolecules 21 (1988) 3139-3146.

Method for Determination of Weight Percentage of ENB in an Ethylene/Propylene/ENB (EPDM) Terpolymer Using FTIR The weight percentage of 5-ethylidenenorbornene (ENB) can be determined using a Fourier Transform Infrared Spectroscopic (FTIR) method (for example, ASTM D65047-99). According to this ASTM D65047-99 method, the ENB content is determined from its infrared absorbance at 1681-1690 $cm^{-1}$, a measure of the ENB's exocyclic double bond. For EPDM catalyzed with a single site catalyst, the infrared absorbance band at about 1688 $cm^{-1}$ can be used. The absorbance of the EPDM interpolymer at 1688 $cm^{-1}$ is related to ENB mass fraction, and the mass fraction is determined by calibrating the instrument with known EPDM standards. The presence of oil and other components are first removed, such as by extraction, before the FTIR analysis. For oil-extended polymers, the oil can be removed using ASTM Method D 1416, section 67 through 74, and ASTM Method D 297.

The FTIR spectra are collected with 32 scans, at a resolution of 2 $cm^{-1}$. The spectra for the dry empty specimen compartment (Po) were first collected. The test sample is placed in the specimen compartment, and the dry atmosphere is re-established inside the specimen compartment. The single beam spectra (P) are collected, and the specimen absorbance (A) is calculated according to the following equation: $A = -\log 10(P/Po)$.

The calibration may be made using known standards covering the desired weight percent diene range, typically from 0 to 10 weight percent. The calibration may be based on primary standards for which the weight percent of ENB may be established via the use of primary methods, such as Nuclear Magnetic Resonance (NMR) methods.

The FTIR test specimen are prepared by pressing 0.20+/−0.05 grams of the polymer sample, placed between two Mylar sheets, using a platen press, heated at 125° C.+/−5° C., and a 4 MPa pressure, for 60+/−10 seconds. The pressed sheet is cooled to ambient temperature. A piece of the pressed film is cut into "15 mm by 50 mm" sized sample, and placed into the FTIR spectrophotometer sample holder window for spectral acquisition.

Additional spectroscopic methods are described in the following references, each fully incorporated herein by reference.

1. ASTM D 6047-99, "Standard Test Methods for Rubber, Raw—Determination of 5-Ethylidenenorbornene (ENB) or Dicyclopentadiene (DCPD) in Ethylene-Propylene-Diene (EPDM) Terpolymers", Annual Book of ASTM Standards, 1999 Issue.
2. J. M. Winter, M. S. Edmondson, D. R. Parikh, D. J. Mangold, and M. J. Castille, Jr. "Thermal and Spectroscopic (Vibrational and Nuclear Magnetic Resonance) Characterization of Ethylene-Propylene-Diene (EPDM) Elastomers", Presented at 152nd Fall Technical Meeting, Rubber Division, American Chemical Society, Cleveland, Ohio, Oct. 21-24, 1997. Paper No. 40.
3. S. DiMartino and M. Kelchtermans, Determination of the composition of ethylene-propylene-rubbers using 13C-NMR spectroscopy, J. Appl. Poly. Sci. 2003, 56 (13), 1781-1787.
4. Hayashi, T., Inoue, Y., Chujo, R., "Ethylene-Propylene Copolymerization Mechanism Based on the Sequence Distributions Determined by 13C NMR Spectra", Macromolecules 1988, 21, 3139-3146.
5. Ray, G. J., Johnson, P. E., Knox, J. R., "Carbon-13 Nuclear Magnetic Resonance Determination of Monomer Composition and Sequence Distributions in Ethylene-Propylene Copolymers Prepared with a Stereoregular Catalyst System', Macromolecules 1977, 10, 773-778.

Formulations

All EPDM formulations were prepared in a HARBURG-FREUDENBERGER GK 1.5E intermeshing internal mixer with 1.5 liter volume. The temperature of the water in the heating jacket of the mixing chamber was 50° C. All components including crosslinking agent were added at once, and mixed at 50 rpm, until the formulation reached 95° C. The ram was lifted, swept and re-lowered, and the compound mixed for a further 60 seconds. After this time, the door below the mixer was opened, and the uncured compound allowed to fall into a receptacle.

Sheets of uncured compound approximately 5 mm thick were obtained by passing the compound, obtained on the internal mixer, between the rolls of a 15 cm two-roll mill, manufactured by J.R Dare (model 300×150 mm Lab Mill). The temperature of the water in the rolls was maintained at 50° C., and the roll speed was 20 rpm.

Sheets of vulcanized rubber were obtained by compression molding the uncured sheet from the above roll mill Test samples about "15 cm×15 cm×2 mm" were vulcanized by compression molding a section of the above sheet, following ASTM D3182 (2001), into "2 mm thick" plaques, by vulcanizing for a time of t95 plus three minutes, at the desired curing temperature (sulfur formulations were cured at 160° C.; peroxide formulations were cured at 175° C.), using a press manufactured by Bürkle of Freudenstadt, Germany model LA100 at a pressure of 200 N/cm². Pips (6 mm thickness) for the compression set test were vulcanized for a time of t95 plus 15 minutes. The measure "t95" is the time in minutes to required reach 95 percent of the maximum torque in the MDR test as described in ISO 6502, at the temperature of cure. Cured specimens were conditioned in air at 23° C. and 50 percent relative humidity for at least 24 hours before testing. Samples from the cure sheet were cut to the dimensions specified in the corresponding ISO or ASTM norm, using cutters supplied by the NAEF company of Zurich Switzerland.

Compression set was measured on the vulcanized sample according to ISO 815: 1991 Method B, at 25 percent deflection for 22 hours, using specimens of "13 mm diameter," and either comprised of 3 plies of "2 mm thickness" or a single molded pip of "6 mm thickness," as noted in the tables below. The actual height of the pip was measured, and the thickness of the spacers between the plates was chosen to ensure that the deflection is 25+/−1 percent. After the test, the test plates are placed on a wooden surface and opened immediately. The thickness of the specimens is measured after 30 minutes after equilibrating at ambient conditions (typically, 23° C. and 50 percent relative humidity).

Mooney viscosity (ML1+4 at 125° C.) of the EPDM formulations was measured in accordance with ASTM 1646-04, with a one minute preheat time and a four minute rotor operation time. The instrument was an Alpha Technologies Rheometer MV2000E.

The Mooney scorch (125° C.) was measured on the uncured elastomers using an Alpha Technologies MV 2000E. The tests were run at 125° C. using the "small" rotor, as described in ASTM D1646-04. The t5 and t30 data (time taken for the reading to increase by 5 and 30 Mooney units respectively) were tabulated.

The MDR data, used describe the curing properties of the compound, including the t95 percent cure time used to determine the time required for compression molding, were obtained according to ISO6502: 1991 using an Alpha Technologies MDR 2000 rheometer, at the desired vulcanization temperature (sulfur formulations were cured at 160° C.; peroxide formulations were cured at 175° C.). The "t95" is the time, in minutes, required to reach 95 percent of the maximum torque, as described in Rubber Technology Compounding and Testing for Performance, J. S. Dick, Hanser Munich 2001, pp. 38-39.

Tensile Strength and Percent Elongation were each measured according to ISO 37: 2005, using cured samples cut to the T2 shape, and a strain rate of 500 mm/min using a tensile tester manufactured by Zwick-Roell of Ulm, Germany (model Z010).

Compound hardness was measured to Shore A according to ISO 868:2003 at 23° C., using a machine manufactured by Zwick Roell (model 7206.07/00). The stylus contacted the cured specimen for three seconds before the reading was taken.

Low Shear Viscosity ($\eta$ at 0.1 rad/sec, 190° C.)

A 25 mm parallel plate was used for this melt rheology measurement. The sample was prepared by compression molding 2.0 to 2.2 grams of polymer in a circular mold of "2.1 mm in thickness" and "25 mm in diameter." The sample was molded at 190° C. and 20,000 psi for four minutes, and then cooled with chilled water (5-10° C.) in a platen press for two minutes.

Melt rheological testing was performed on a TA Instruments Advanced Rheometric Expansion System (ARES), equipped with 25 mm parallel plates under a nitrogen purge. The sample was placed in the sample chamber, and heated at 190° C. for five minutes. The sample was pressed to 2.1 mm, and the edge was trimmed. The sample was heated for another five minutes, and then pressed to 2.0 mm, and the edge was trimmed again. The rheological test was conducted at 190° C. over a frequency range from 0.1 to 100 rad/sec. A strain of 10 percent was set for all samples.

The following examples illustrate, but do not, either explicitly or by implication, limit the present invention.

EXPERIMENTAL

Polymerization

In general terms, it is desirable to produce the inventive polymer under the conditions as explained in U.S. Pat. Nos. 5,977,251 and 6,545,088, and the references therein. The polymer product of EPDM 51 was produced in a solution polymerization process using two continuously mixed, loop reactors, operated in series. The catalyst (for example, a fused ring substituted indenyl titanium complex (CGC)) was activated in situ, with a trispentafluorophenyl borane or tetrakispentafluorophenyl borate activator, and modified methyl aluminoxane scavenger. The polymer product was stabilized with 2000 ppm IRGANOX 1076, which is a hindered phenol stabilizer, that is, octadecyl-3,5-ditertiarybutyl-4-hydroxyhydrocinnamate. IRGANOX is a trademark of, and made by, Ciba-Geigy Corporation.

Ethylene was introduced in a mixture of a solvent of ISOPAR E (a mixture of C8-C10 saturated hydrocarbons available from ExxonMobil), propylene and 5-ethylidene-2-norbornene (ENB), forming a first reactor feed stream. The outlet of the first reactor feed stream was consequently a mixture of produced first reactor polymer, solvent, and reduced levels of the initial monomer streams. The molecular weight of the first reactor polymer (and second reactor polymer) may be controlled by adjusting reactor temperature and/or the addition of a chain terminating agent such as hydrogen. Similar to the first reactor feed stream, additional reactive components were added prior to the second reactor. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent two phase flow at any point in the process.

After polymerization, a small amount of water was introduced into the reactor stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and reintroduced into the process as appropriate. Table 1 describes the overall product characterization.

TABLE 1

|  | Values |
| --- | --- |
| First Reactor - Product Targets | |
| Ethylene, wt % | 64 |
| ENB, wt % (FTIR) | 4 |
| First Reactor - Results | |
| Mooney (ML 1 + 4, 125° C.) | 90 |
| Final - Product Targets | |
| Ethylene, wt % | 71 |
| ENB, wt % (FTIR) | 5 |
| Final Product Properties | |
| Mooney (ML 1 + 4, 125° C.) | 80-85 |

In one embodiment, monomers, solvent, catalyst, cocatalyst, as well as a small amount of MMAO as a scavenger, were flowed to the first reactor (R1), according to the process conditions in Table 2. The first reactor contents (see Table 2) were flowed to a second reactor (R2) in series. Additional solvent, monomers, catalyst and cocatalyst were added to the second reactor, as well as a small amount of MMAO as a scavenger. The weight percent solids of polymer entering the second reactor was 9.0 percent, by weight, of dry polymer relative to solvent, monomers, and catalyst flows.

TABLE 2

|  | R1 | R2 |
| --- | --- | --- |
| Reactor Control Temp. (° C.) | 88 | 105 |
| Solvent (ISOPAR E) Feed (wt %) | 84.9 | 78+ |
| Ethylene Feed (wt %) | 7.6 | 7.5+ |
| Propylene Feed (wt %) | 6.5 | 4.2+ |
| ENB Feed (wt %) | 0.82 | 1.07+ |
| Hydrogen Feed (wt %) | 0.000014 | 0.000019+ |
| Catalyst Conc. (MM lb poly/lb Ti)* | 0.84 | 1.67 |
| Cocatalyst Conc. (molar ratio to catalyst) | 4.0 | 4.0 |

TABLE 2-continued

|  | R1 | R2 |
| --- | --- | --- |
| MMAO** Conc. (molar ratio to catalyst) | 5 | 5 |
| Wt fraction produced in reactor# | 45 | 55 |

*Catalyst addition is defined as one million pounds of polymer produced per pound of Ti in the catalyst.
Catalyst = (t-butlyamido) dimethyl ($\eta^5$-2-methyl-s-indacen-1-yl) silanetitanium 1,3-pentadiene (other suitable catalysts described in U.S. Pat. No. 5,965,756). Cocatalyst is trispentafluorophenyl borane.
**MMAO-3A available from Akzo Nobel.
+Inclusive of the solvent and unreacted components from the first reactor flowing into the second reactor.
Fraction of the total polymer weight produced in the first and second reactor on a dry polymer basis.

Figure 1:
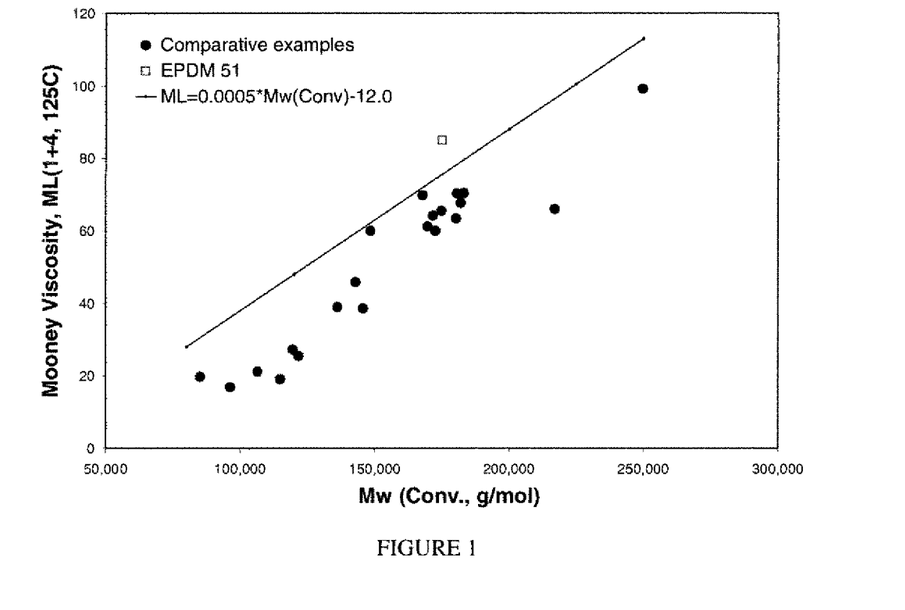
FIG. 1 depicts the Mooney viscosity (ML, 1+4, 125° C.) versus molecular weight (Mw(conv) for the inventive EPDM and the comparative EPDMs.
Figure 2:
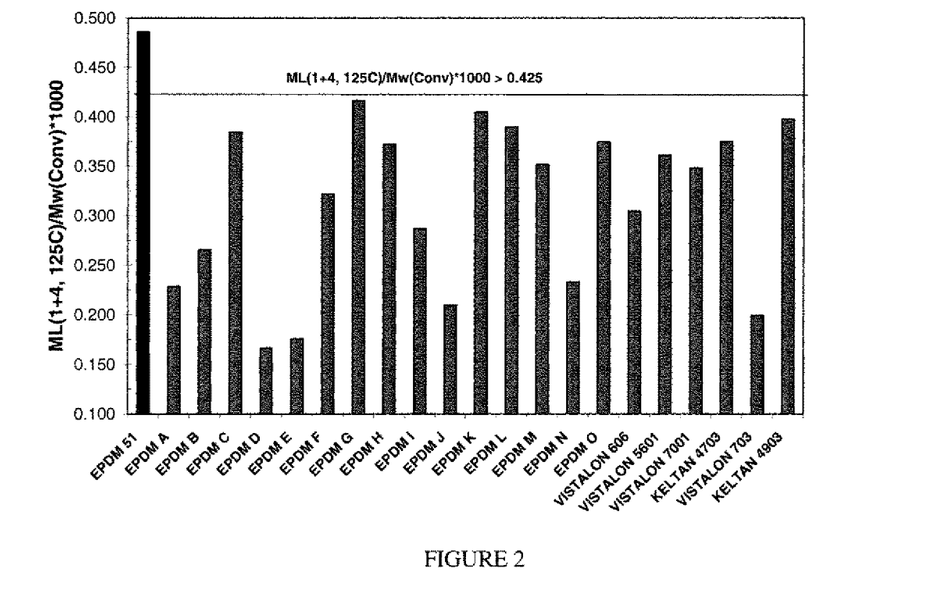
FIG. 2 is a bar graph showing the ratio of Mooney viscosity to weight average molecular weight (or (Mooney viscosity (ML, 1+4, 125° C.)/Mw(conv))*1000) for the inventive and comparative EPDMs.
Figure 3:
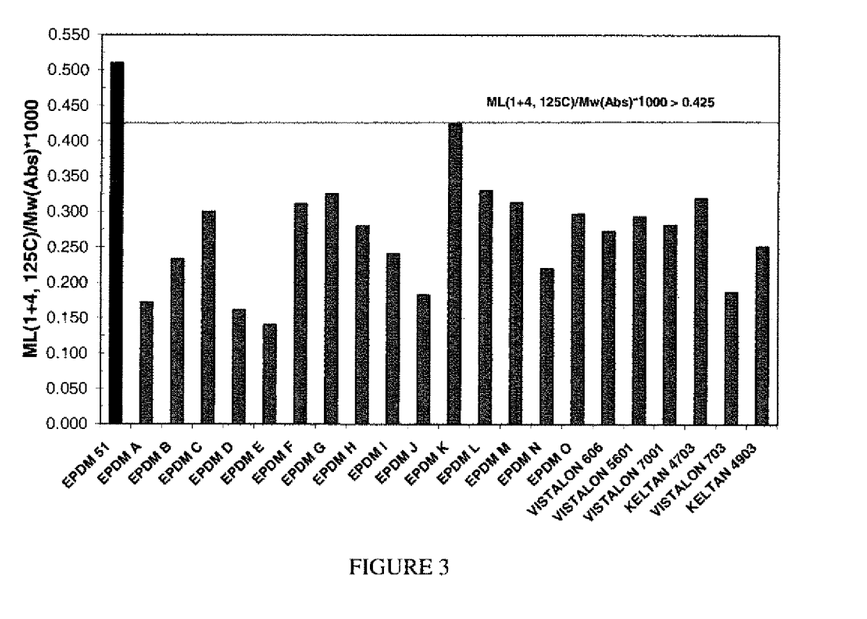
FIG. 3 is a bar graph showing the ratio of Mooney viscosity to weight average molecular weight (or (Mooney viscosity (ML, 1+4, 125° C.)/Mw(abs))*1000) for the inventive and comparative EPDMs.
Figure 4:
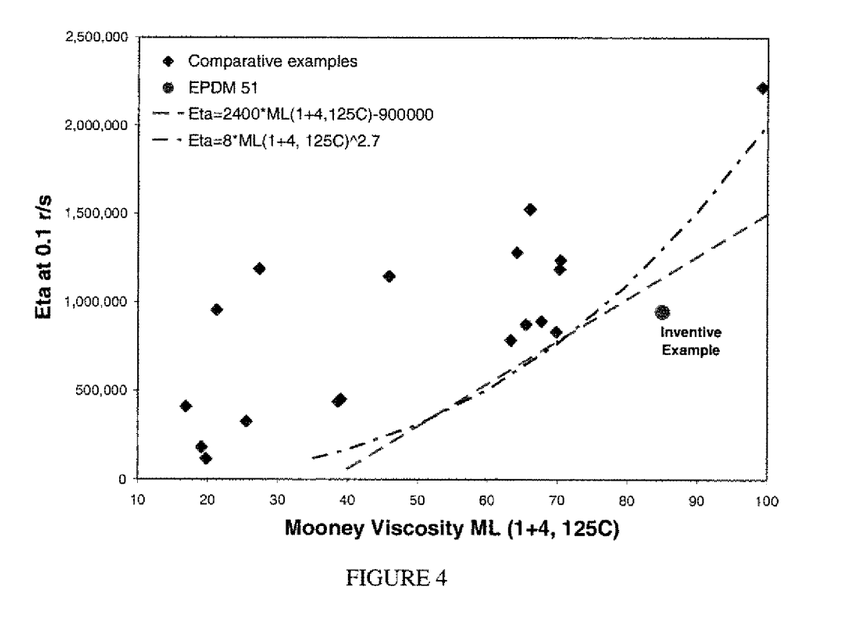
FIG. 4 depicts the "shear rate at 0.1 rad/sec" versus the "Mooney viscosity (ML, 1+4, 125° C.)" for the inventive and comparative EPDMs.

Additional properties of the inventive polymer and some comparative polymers are shown in Table 3 below, and their molecular weight properties are shown in Table 4 below. Additional viscosity/molecular weight relationships for these polymers are shown in FIGS. 1-3. FIG. 4 provides a low shear rate viscosity versus Mooney viscosity profile for these polymers. As shown in FIGS. 1-3, the inventive EPDM has a much higher Mooney viscosity at molecular weights (Mw (conv), Mw(abs)) similar to comparative EPDMs. As shown in FIG. 4, the inventive EPDM has a much lower shear viscosity at a higher Mooney viscosity relative to the comparative EPDMs.

TABLE 3

EPDM Polymers

| EPDM | Mooney Viscosity of Neat Polymer* ML(1 + 4, 125° C.) | [ML(1 + 4, 125° C.)/ Mw(conv)]*1000 | ENB wt %- (FTIR) |
| --- | --- | --- | --- |
| EPDM 51 (Inv.) | 80-85 | >0.429 | 5 |
| Comparatives** | | | |
| KELTAN 4703 | 65.5 | 0.37 | 9 |
| KELTAN 4903 | (60 at (1 + 8) at 150 C.) | 0.40 | 9 |
| VISTALON 5601 | 61.2 | 0.36 | 5 |
| VISTALON 7001 | 60 | 0.35 | 5 |
| EPDM A | 27.3 | 0.23 | 0.9 |
| EPDM B | 38.6 | 0.27 | |
| EPDM C | 70.4 | 0.38 | |
| EPDM D | 19.1 | 0.17 | |
| EPDM E | 16.9 | 0.18 | |
| EPDM F | 45.9 | 0.32 | |
| EPDM G | 21.0 | 0.13 | 2 |
| EPDM H | 67.7 | 0.37 | |
| EPDM I | 39.0 | 0.29 | 4 |
| EPDM J | 25.5 | 0.21 | |
| EPDM K | 60.6 | 0.41 | |
| EPDM L | 70.3 | 0.39 | |
| EPDM N | 63.3 | 0.35 | |
| EPDM O | 19.8 | 0.23 | |
| EPDM P | 98.9 | NA | 3 |
| EPDM Q | 64.2 | 0.37 | 2 |

*Neat polymer (no oil, no carbon black)
**EPDM A-O are dual polymerization products.
NA = Not applicable because of carbon black presence.

TABLE 4

Analytical Properties of Polymers

| EPDM | Mn* | Mw* | Mz* | Mw*/Mn* | Mn** | Mw** | Mz** | Mw**/Mn** |
| --- | --- | --- | --- | --- | --- | --- | --- | --- |
| EPDM 51 | 68779 | 174790 | 374850 | 2.55 | 75759 | 186791 | 489575 | 2.47 |
| KELTAN 4703 | 65830 | 174840 | 376900 | 2.66 | 75636 | 204860 | 474700 | 2.71 |
| KELTAN 4903 | 69,630 | 249,720 | 868,400 | 3.59 | 89,641 | 393,730 | 1,134,000 | 4.39 |
| VISTALON 5601 | 48910 | 169580 | 466600 | 3.47 | 57380 | 208480 | 572400 | 3.63 |
| VISTALON 7001 | 44660 | 172540 | 569400 | 3.86 | 54828 | 213050 | 583100 | 3.89 |
| EPDM A | 53690 | 119420 | 221300 | 2.22 | 72079 | 158700 | 285200 | 2.20 |
| EPDM B | 45620 | 145620 | 356300 | 3.19 | 51803 | 165370 | 386900 | 3.19 |
| EPDM C | 70080 | 183130 | 383900 | 2.61 | 91157 | 234420 | 474200 | 2.02 |
| EPDM D | 28350 | 114810 | 358700 | 4.05 | 29178 | 118250 | 332800 | 4.05 |
| EPDM E | 24200 | 96310 | 260800 | 3.98 | 25296 | 119900 | 338300 | 4.74 |

TABLE 4-continued

Analytical Properties of Polymers

| EPDM | Mn* | Mw* | Mz* | Mw*/Mn* | Mn** | Mw** | Mz** | Mw**/Mn** |
|---|---|---|---|---|---|---|---|---|
| EPDM F | 56440 | 142710 | 273500 | 2.53 | 54885 | 147340 | 272100 | 2.68 |
| EPDM G | 59000 | 167770 | 369100 | 2.84 | 75813 | 214430 | 457000 | 2.83 |
| EPDM H | 71400 | 181940 | 371800 | 2.55 | 93089 | 241650 | 509700 | 2.60 |
| EPDM I | 36900 | 136090 | 334600 | 3.69 | 41977 | 161840 | 397400 | 3.86 |
| EPDM J | 33350 | 121640 | 332800 | 3.65 | 39925 | 139430 | 371700 | 3.49 |
| EPDM K | 68540 | 148380 | 277100 | 2.16 | 65471 | 141430 | 267300 | 2.16 |
| EPDM L | 59360 | 180590 | 424000 | 3.04 | 68248 | 212610 | 499000 | 3.12 |
| EPDM M | 54090 | 180240 | 434100 | 3.33 | 62939 | 201690 | 468400 | 3.20 |
| EPDM N | 36320 | 85090 | 163300 | 2.34 | 38091 | 89920 | 169,000 | 2.36 |
| EPDM O | 65010 | 171580 | 366800 | 2.64 | 80761 | 216010 | 454600 | 2.64 |

*Conventional GPC
**Absolute GPC (Light Scattering)

Several polymer formulations, as shown in Tables 5 and 6, were prepared for mechanical testing. The mechanical properties of these formulations are shown in Table 7.

TABLE 5

Formulations for Sulfur Cure

| Samples* | Example 1 (Inventive) | Example A (Comparative) | Example B (Comparative) | Example C (Comparative) |
|---|---|---|---|---|
| EPDM 51 (phr) | 100 | | | |
| EPDM K (phr) | | 100 | | |
| EPDM L (phr) | | | 100 | |
| EPDM P (phr) | | | | 100 |
| Paraffin Oil (phr) | 50 | 50 | 50 | 50 |
| N550 CB (phr) | 80 | 80 | 80 | 80 |
| Sulfur (phr) | 1.5 | 1.5 | 1.5 | 1.5 |
| ZnO (phr) | 5 | 5 | 5 | 5 |
| StH (stearic acid) (phr) | 1 | 1 | 1 | 1 |
| TMTD (tetramethyl thiuram disulfide) (phr) | 0.5 | 0.5 | 0.5 | 0.5 |
| BUTYL ZIMATE (phr) | 2 | 2 | 2 | 2 |
| MBT (2-merpto-benzothiazole) (phr) | 1 | 1 | 1 | 1 |

*Weight (phr) relative to 100 parts rubber (EPDM).

TABLE 6

Formulations for Peroxide Cure

| Samples* | Example 2 (Inventive) | Example D (Comparative) | Example E (Comparative) | Example F (Comparative) |
|---|---|---|---|---|
| EPDM 51 | 100 | | | |
| EPDM K | | 100 | | |
| EPDM L | | | 100 | |
| EPDM P | | | | 100 |
| Paraffin Oil (g) | 70 | 70 | 70 | 70 |
| CB N650 (g) | 115 | 115 | 115 | 115 |
| Stearic acid (g) | 1 | 1 | 1 | 1 |
| DCP-40%** (phr) | 8 | 8 | 8 | 8 |
| TMQ*** (ppr) | 1 | 1 | 1 | 1 |
| HVA #2**** (phr) | 1 | 1 | 1 | 1 |

*Weight (phr) relative to 100 parts rubber (EPDM).
**DCP-40% is dicumy peroxide at 40% active ingredient dispersed on inert mineral filler.
***TMQ is 1,2-dihydro-2,2,4-trimethylquinoline.
****HVA #2 is N,N' phenylene bismaleimide.

TABLE 7

Test Properties

| | Sulphur Cure | | | | Peroxide Cure | | | |
|---|---|---|---|---|---|---|---|---|
| | EPDM P Ex. C | EPDM L Ex. B | EPDM K Ex. A | EPDM 51 Ex. 1 | EPDM P Ex. F | EPDM L Ex. E | EPDM K Ex. D | EPDM 51 Ex. 2 |
| Mooney Viscosity, ML1 + 4, 100° C. | 80 | 71 | 60 | 79 | 85 | 76 | 67 | 83 |
| Mooney Scorch, 125° C., minutes to 5 pt rise | 10.8 | | 11.4 | 9.6 | 12.6 | 13.6 | 12.6 | 12.4 |
| MDR t95 | 16.2 | 19.3 | 18.2 | 20.7 | 3.7 | 3.7 | 4.0 | 3.6 |
| Physical Properties at 23° C. | Press cured: tc95 + 3 mins | | | | Press cured: tc95 + 3 mins | | | |
| Tensile Strength, MPa | 15.94 | 17.15 | 13.13 | 14.95 | 12.89 | 14.44 | 12.39 | 13.87 |
| Elongation, % | 418 | 432 | 362 | 378 | 364 | 285 | 274 | 293 |
| Hardness, Shore A | 65 | 75 | 72 | 71 | 66 | 77 | 74 | 73 |
| Compression Set, Method B (6 mm pips) cured MDR t95 + 15 min.) | | | | | | | | |
| 22 hr/−25° C. 30 min | 12 | 17 | 15 | 13 | 14 | 18 | 13 | 10 |
| 22 hr/70° C. | 16 | 15 | 16 | 16 | 12 | 8 | 10 | 9 |
| 22 hr/100° C. | 26 | 25 | 29 | 25 | 32 | 34 | 34 | 33 |
| 70 hr/125° C. | 57 | 54 | 58 | 53 | 12 | 8 | 9 | 9 |
| 70 hr/150° C. | 63 | 62 | 65 | 60 | 24 | 19 | 19 | 22 |

As shown in Table 7, the unique balance of molecular architecture of the inventive EPDM enables the production of a dense weather strip compound which will meet a minimum of "8 MPa tensile strength," a maximum of 35 percent compression set up to 100° C., a compound Mooney viscosity, and other good properties. Compared to the comparative polymers, the inventive polymer is seen to have fast cure and good mechanical properties. Further the inventive polymer has a pellet form, which enables both rapid mixing at the compounder and high productivity. The inventive EPDM also provides a fast cure, and high scorch resistance.

Additional formulations and their associated properties are shown in Table 8.

TABLE 8

Additional Formulations and Properties

|  | 1 | 2 | 3 | 4 | 5 | 6 |
|---|---|---|---|---|---|---|
| EPDM P | 128 | 128 | 128 | | | |
| EPDM 51 | | | | 100 | 100 | 100 |
| Carbon Black type ASTM N550 | 142 | 152 | 212 | 170 | 180 | 240 |
| Calcium carbonate | 60 | 80 | 130 | 60 | 80 | 130 |
| Paraffinic Oil | 110 | 120 | 170 | 110 | 120 | 170 |
| Stearic acid | 1 | 1 | 1 | 1 | 1 | 1 |
| Zinc oxide | 5 | 5 | 5 | 5 | 5 | 5 |
| 300 mesh sulphur | 0.3 | 0.3 | 0.3 | 0.3 | 0.3 | 0.3 |
| Tetramethylthiiuram disulphide | 1.6 | 1.6 | 1.6 | 1.6 | 1.6 | 1.6 |
| Zinc di-n-butyl dithiocarbamate | 1.9 | 1.9 | 1.9 | 1.9 | 1.9 | 1.9 |
| Tetramethylthiuram monosulphide | 0.6 | 0.6 | 0.6 | 0.6 | 0.6 | 0.6 |
| 4,4'-dithiomorpholine | 2 | 2 | 2 | 2 | 2 | 2 |
| Total loading of oil, filler, polymer and curatives | 450 | 500 | 650 | 450 | 500 | 650 |
| Mooney Viscosity, ML1 + 4, 100° C. | 62 | 60 | 50 | 65 | 61 | 51 |
| Mooney Scorch, 125° C., minutes to 5 pt rise | 14 | 14.6 | 16.1 | 12 | 12.8 | 14.7 |
| MDR t95 | 2.8 | 3.1 | 3.0 | 2.8 | 2.9 | 2.8 |
| Physical Properties at 23° C. | Press cured: tc95 + 3 mins | | | Press cured: tc95 + 3 mins | | |
| Tensile Strength, MPa | 8.1 | 7.2 | 5.4 | 7.6 | 7.2 | 5.4 |
| Elongation, % | 634 | 567 | 518 | 623 | 610 | 529 |
| Hardness, Shore A | 64 | 65 | 74 | 72 | 71 | 70 |
| Compression Set, Method B (6 mm pips) cured MDR t95 + 15 min.) | | | | | | |
| 22 hr/−10° C. 30 min | 7 | 7 | 10 | 6 | 6 | 11 |
| 22 hr/70° C. | 12 | 10 | 10 | 20 | 16 | 22 |
| 22 hr/100° C. | 12 | 12 | 22 | 16 | 16 | 16 | compounds cured at 180° C.

As shown in Table 8, the tensile properties (tensile strength and elongation to break) and compression set properties worsen, as the amount of oil and filler increase. Concurrently, the curing performance, as measured by t95, becomes slower. However, the EPDM 51 retains properties slightly better, at high oil and filler extension levels, than EPDM P. Tensile strength decreases by 2.2 MPa (see Examples 4 and 6) for EPDM 51, but by 2.7 MPa for EPDM P (see Examples 1 and 3). Percent elongation decreases by 116 percent (units) for EPDM P, and by 94 percent (units) for EPDM 51.

The inventive composition can be used in weather-strip applications, and in other extrusion applications, such as injection molded parts (for example, automotive parts). The inventive polymer would be expected to be useful in other extruded applications, such as hoses, wire & cable jacketing, and sports flooring. The unique balance of a crystalline and soft phase will make this polymer useful as the soft phase in a TPV composition.

The invention claimed is:

1. A composition comprising a first composition, which comprises the following:
A) a first interpolymer comprising, in polymerized form, ethylene, an α-olefin and a nonconjugated polyene;
B) a second interpolymer comprising, in polymerized form, ethylene, an α-olefin and a nonconjugated polyene; and
wherein the first composition has an $[(ML(1+4, 125°\ C.))/M_w(conv)]*1000$ greater than 0.429 mole/g, and
wherein the ratio of the Mooney (ML, 1+4, 125° C.) of the first interpolymer to the second interpolymer is from 1.1 to 1.2; and
wherein the first interpolymer has a Mooney viscosity (ML, 1+4, 125° C.) less than, or equal to, 120.

2. The composition of claim 1, wherein the first composition has an $[(ML(1+4, 125°\ C.))/M_z(BB)]*1000$ greater than 0.23.

3. The composition of claim 1, wherein the ratio of the weight average molecular weight of the first interpolymer to the weight average molecular weight of the second interpolymer, $M_{w(conv,\ first)}/M_{w(conv,\ second)}$, is greater than 1.05.

4. The composition of claim 1, wherein the ratio of the polyene content in the second interpolymer to the polyene content in the first interpolymer, polyene (2)/polyene (1), is greater than 1.0.

5. The composition of claim 1, wherein the difference (absolute) in the polyene content of the second interpolymer and the first interpolymer (polyene (2)-polyene (1)) is greater than 0.3 weight percent.

6. The composition of claim 1, wherein the total polyene content of the first interpolymer and the second interpolymer is less than, or equal to, 8 weight percent, based on the sum weight of the first interpolymer and second interpolymer.

7. The composition of claim 1, wherein the ratio of the ethylene content in the second interpolymer to the ethylene content in the first interpolymer (EE(2)/EE(1)) is greater than, or equal to, 1.05.

8. The composition of claim 1, wherein the first interpolymer has a Mooney viscosity (ML, 1+4, 125° C.) greater than 40, and the second interpolymer has a Mooney viscosity (ML, 1+4, 125° C.) greater than 35.

9. The composition of claim 1, wherein the first interpolymer and the second interpolymer are prepared sequentially in at least two reactors.

10. The composition of claim 1, wherein the first interpolymer is an EPDM(1), and the second interpolymer is an EPDM(2).

11. The composition of claim 1, wherein the composition is in free-flowing pellet form.

12. The composition of claim 1, wherein the first composition comprises greater than 95 weight percent of the first and second interpolymers, based on the weight of the first composition; and wherein the composition consists of the first composition, and one or more additives selected from fillers, antioxidants and antiozonants, foaming agents, vulcanizing agents, or combinations thereof.

13. The composition of claim 12, wherein the first interpolymer and the second interpolymers are prepared in the presence of a single site catalyst.

14. The composition of claim 13, wherein the first composition has a Mooney viscosity (ML, 1+4, 125° C.) from 80 to 85.

15. An article comprising at least one component formed from the composition of claim 1.

16. A composition comprising a first composition, which comprises the following:
  A) a first interpolymer comprising, in polymerized form, ethylene, an $\alpha$-olefin and a nonconjugated polyene;
  B) a second interpolymer comprising, in polymerized form, ethylene, an $\alpha$-olefin and a nonconjugated polyene; and
  wherein the first composition has a Mooney Viscosity (ML, 1+4, 125° C.) greater than, or equal to, 70, and has a low shear viscosity ($\eta$ at 0.1 rad/sec) less than, or equal to, 100,000 Pa·sec, and
  wherein the ratio of the Mooney (ML, 1+4, 125° C.) of the first interpolymer to the second interpolymer is from 1.1 to 1.2; and
  wherein the first interpolymer has a Mooney viscosity (ML, 1+4, 125° C.) less than, or equal to, 120.

17. An article comprising at least one component formed from the composition of claim 16.

18. A composition comprising a first composition, which comprises the following:
  A) a first interpolymer comprising, in polymerized form, ethylene, an $\alpha$-olefin and a nonconjugated polyene;
  B) a second interpolymer comprising, in polymerized form, ethylene, an $\alpha$-olefin and a nonconjugated polyene; and
  wherein the first composition has a Mooney Viscosity (ML (1+4, 125° C.)) greater than, or equal to, 70, and has an [Mw(abs)]/[Mw(conv)] less than 1.2, and
  wherein the ratio of the Mooney (ML, 1+4, 125° C.) of the first interpolymer to the second interpolymer is from 1.1 to 1.2; and
  wherein the first interpolymer has a Mooney viscosity (ML, 1+4, 125° C.) less than, or equal to, 120.

19. An article comprising at least one component formed from the composition of claim 18.

* * * * *